United States Patent [19]
Brayman

[11] 3,738,589
[45] June 12, 1973

[54] REEL FOR WATER SKIING
[76] Inventor: Theron R. Brayman, 1796 Ascott Road, Juno Isles, Fla. 33408
[22] Filed: Sept. 10, 1971
[21] Appl. No.: 179,301

[52] U.S. Cl. .............................. 242/96, 242/129.8
[51] Int. Cl. .......................................... B65h 75/40
[58] Field of Search ..................... 242/96, 85, 85.1, 242/99, 100, 107.3, 129.8; 224/5 F

[56] References Cited
UNITED STATES PATENTS

| | | | |
|---|---|---|---|
| 1,579,886 | 4/1926 | Oxner | 242/96 |
| 3,138,356 | 6/1964 | McClain | 242/96 X |
| 1,768,078 | 6/1930 | Krause | 242/100 |
| 1,814,389 | 7/1931 | Jacobsen | 242/99 |
| 3,011,734 | 12/1961 | Wilkinson | 242/96 |

Primary Examiner—George F. Mautz
Assistant Examiner—Edward J. McCarthy
Attorney—James W. Gillman

[57] ABSTRACT

A reel for winding, storing and paying out a tow line used for water skiing includes a handle integrally molded to a spool. The handle extends outwardly from one of first and second flanges molded to a central body to form the spool. Each flange portion includes a portion which tapers from the maximum diameter of the flange to the central body portion thereby proving means for evenly winding the line on the spool. In another embodiment the spool has a tapered bore that cooperates with a tapered handle on which the spool is mounted. In one position on the handle the handle engages the spool in an interference fit to lock it in position. In another position the spool is free to rotate on the handle for paying out the line.

3 Claims, 4 Drawing Figures

Patented June 12, 1973   3,738,589

INVENTOR.
THERON R. BRAYMAN
BY James Gillman
ATTORNEY.

REEL FOR WATER SKIING

BACKGROUND OF THE INVENTION

One of the more frustrating problems connected with water skiing is paying the skiers line out from the boat and reeling the same back in at the end of the day without getting the line tangled or possibly fouled in the boat's propeller. Various devices have been proposed for handling the lines but at best they are cumbersome and usually only perform one of the desired functions. That is, the device is best suited for either winding the line in or paying the same out but not both.

SUMMARY OF THE INVENTION

It is an object of this invention to provide an improved reel to be used with water skiing tow lines.

It is another object of this invention to provide a reel for use with water skiing tow lines that effectively functions to wind in and store or pay out the line.

In one embodiment of this invention, a reel for winding, storing and paying out water skiing tow lines includes a molded spool having a cylindrical body portion intermediate first and second flange portions. A handle is integrally molded with the spool and extends outwardly from one of the first and second flange portions coaxially with the cylindrical body portion. The handle provides leverage for moving the spool when winding the line thereon or paying the same out. Each flange portion has a diameter substantially greater than the diameter of the central body portion and includes a portion which tapers from the maximum diameter of the flange to the central body portion thereby providing means for evenly winding the line on the spool to keep the same from tangling and also permitting the line to be easily payed out from the spool over the flange portion opposite the flange portion from which the handle extends.

In another embodiment the spool is separate from the handle and has a bore extending through the cylindrical body portion. The handle extends through the spool thereby rotatingly mounting the spool on the handle. The spool and handle each have portions which mutually cooperate with one another for locking the spool in one position on the handle when winding the tow line into the boat for storing the same. In another position on the handle the spool is free to rotate for paying the line out from the boat.

DETAILED DESCRIPTION

Figure 1:
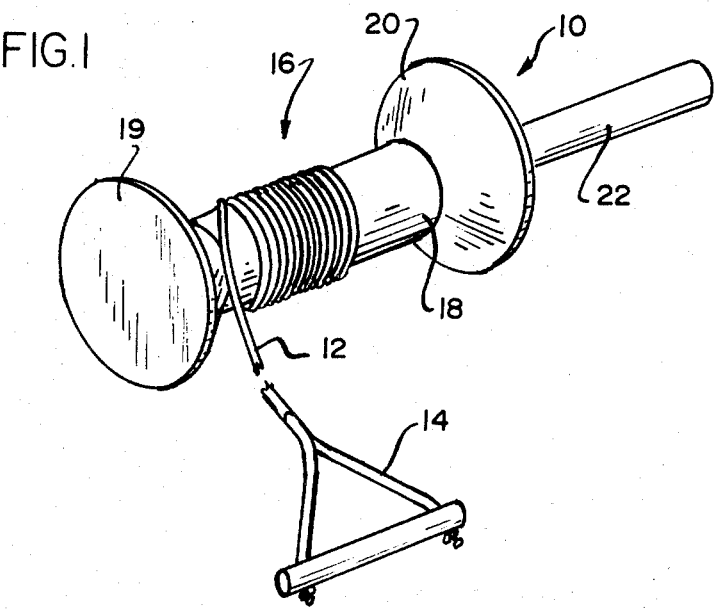
FIG. 1 is a perspective view showing a reel for a water ski tow line in accordance with this invention.

Referring to FIG. 1, there is shown a reel 10 molded from plastic for winding, storing and paying out a tow line 12, which is connected to a handle assembly 14. The tow line in this instance is used for connection to a power driven boat for towing water skiers.

The reel essentially includes a spool 16 having a cylindrical body portion 18 positioned intermediate first and second flange portions 19 and 20. A handle 22 is integrally molded to the flange portion 20 of the spool and extends outwardly therefrom coaxially with the cylindrical body portion 18. The handle 22 provides excellent leverage for moving the spool when winding the line 12 thereon or paying the same out.

Each flange 19 and 20 has a diameter substantially greater than the diameter of the central body portion. Each also includes a portion 24 and 25 respectively, which tapers from the maximum diameter of the flange to the central body portion thereby providing mutual surfaces for evenly winding the line on the spool 16 to keep the same from becoming tangled and also to permit the line 12 to be easily payed out from the spool over the flange portion 19.

Figure 3:
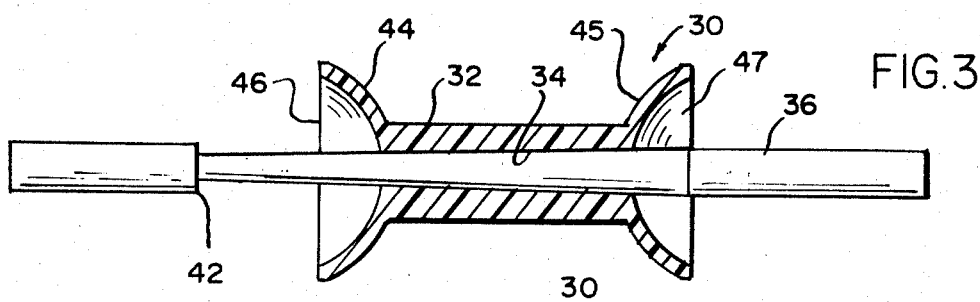
FIG. 3 is a side elevation view in cross-section of a second embodiment of the invention.
Figure 4:
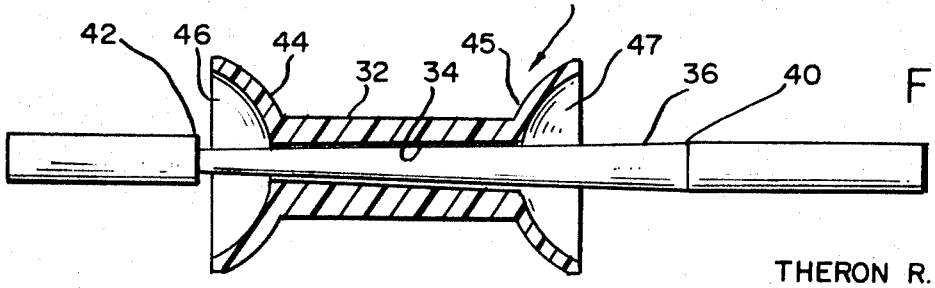
FIG. 4 is a further side elevation in cross-section of the device shown in FIG. 3.

Referring to FIGS. 3 and 4, there is shown another embodiment of this invention. In this embodiment the reel 30 includes a spool 32, which has a bore 34 extending therethrough. A handle 36 extends through the bore 34 such that the spool 32 is rotatably mounted thereon.

The handle 36 has a tapered portion which extends from approximately point 40 on the handle to a stop portion 42. One taper which was found to work suitably was on the order of ⅛ inch to the foot. The bore 34 through the spool 32 is tapered in a similar manner, in this instance also ⅛ inch to the foot. Therefore, the tapered handle portion between 40 and 42 and the tapered bore of the spool 32 provide mutually cooperating portions on the spool 32 and handle 36 which coact to lock and unlock the spool on the handle 36.

Figure 2:
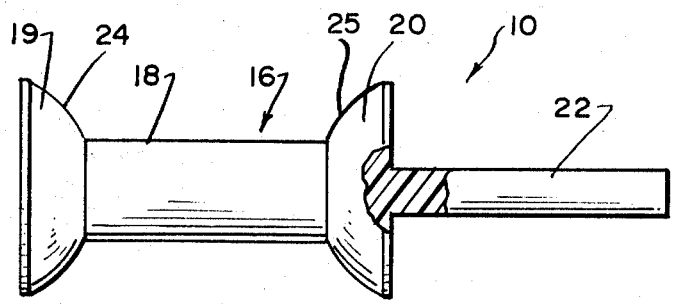
FIG. 2 is a side elevation view partially in cross-section of the reel of FIG. 1.

In the first position shown in FIG. 3, the spool 32 is moved on the handle 36 so the respective tapered portions of the handle and spool engage in an interference fit to lock the spool thereon. With the spool in the locked position, the handle is manipulated in a manner similar to the embodiment shown in FIGS. 1 and 2 to wind the line back into the boat for storing the same. The tapered portions 44 and 45 on the flanges 46 and 47 respectively provide the same function as described for the portions 24 and 25 in FIG. 2.

In the second position shown in FIG. 4, the spool 32 is moved on the handle 36 to a position where the bore 34 diameter is greater than the diameter of handle 36. At this point the spool can freely rotate on the handle. In this second position the operator grasps the handle on either side of the spool and the line may be rapidly payed out from the boat to the skier in the water. The stop portion 42 guides and prevents the spool from falling off the end of the handle 36.

What has been described therefore is an economical and improved reel to be used with water skiing tow lines that effectively functions to wind in and store or pay out the line.

I claim:

1. A reel for winding, storing and paying out a tow line used for water skiing, including in combination, a spool comprising a central body portion intermediate first and second flange portions and having a bore therethrough, a handle, said handle extending through the bore thereby rotatingly mounting the spool thereon, and locking means comprising said handle having an axially extending tapered portion, and said spool having the bore thereof tapering the length thereof, said spool having a first position on said handle wherein the respective tapered portions of said handle and said spool engage in an interference fit to lock said spool in position thereon, said spool having a second position on said handle wherein the respective tapered portions of said handle and said spool are disengaged to permit said spool to rotate freely on said handle.

2. The reel of claim 1 wherein said handle further includes a portion of increased diameter terminating the tapered portion of said handle adjacent said second position of said spool thereby providing a stop to maintain said spool on said handle with the same rotating freely thereon.

3. The reel of claim 2 wherein said first and second flange portions have a diameter substantially greater than the diameter of said central body portion, and each include a portion which tapers from the maximum diameter of the flange to the central body portion thereby providing means for evenly winding the line on the spool.

* * * * *